No. 741,796. PATENTED OCT. 20, 1903.
J. D. IHLDER.
MOTOR CONTROL.
APPLICATION FILED MAY 5, 1902.
NO MODEL.

Witnesses

Inventor
John D. Ihlder
By
Finch & Freeman,
Attorneys

No. 741,796. Patented October 20, 1903.

UNITED STATES PATENT OFFICE.

JOHN D. IHLDER, OF YONKERS, NEW YORK, ASSIGNOR TO OTIS ELEVATOR COMPANY, OF EAST ORANGE, NEW JERSEY, A CORPORATION OF NEW JERSEY.

MOTOR CONTROL.

SPECIFICATION forming part of Letters Patent No. 741,796, dated October 20, 1903.

Application filed May 5, 1902. Serial No. 106,073. (No model.)

*To all whom it may concern:*

Be it known that I, JOHN D. IHLDER, a citizen of the United States, residing at Yonkers, in the county of Westchester and State of New York, have invented certain new and useful Improvements in Motor Control, of which the following is a specification.

My invention relates to motor control; and its objects are to enable a motor to start with any load and practically unlimited current without the aid of a mechanical dash-pot controlling the starting resistance. In place of the usual mechanical dash-pot I provide an electrical equivalent of the same so arranged that the starting resistance is not short-circuited too rapidly.

Further objects of my invention will hereinafter appear; and to these ends my invention consists of the apparatus and system of control for carrying out the above objects and having the general mode of operation, substantially as hereinafter fully described, and shown in the accompanying specification and drawings, in which—

Figure 1:
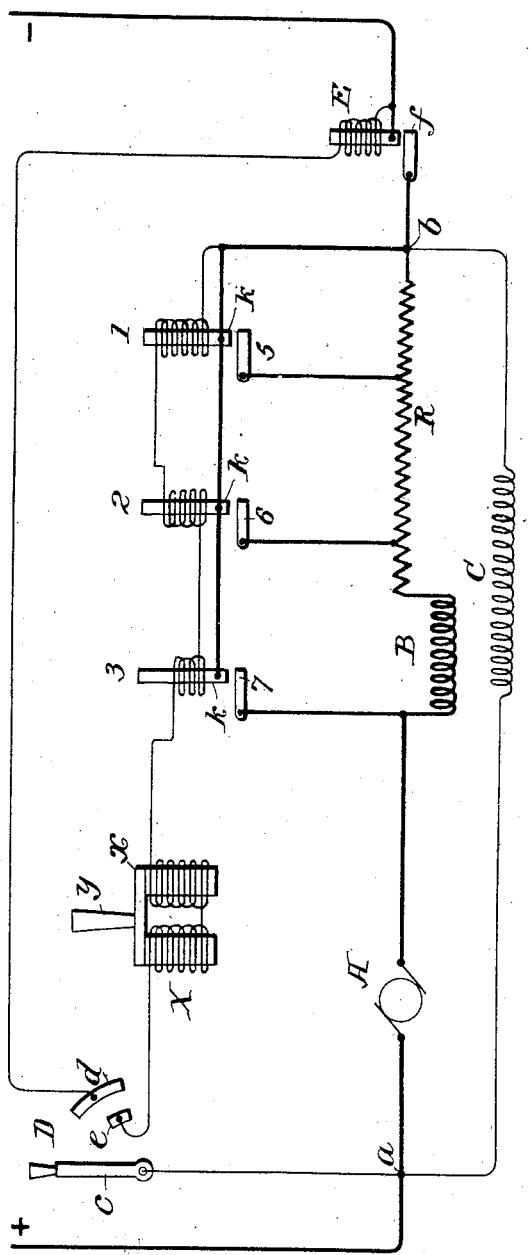
Figure 2:
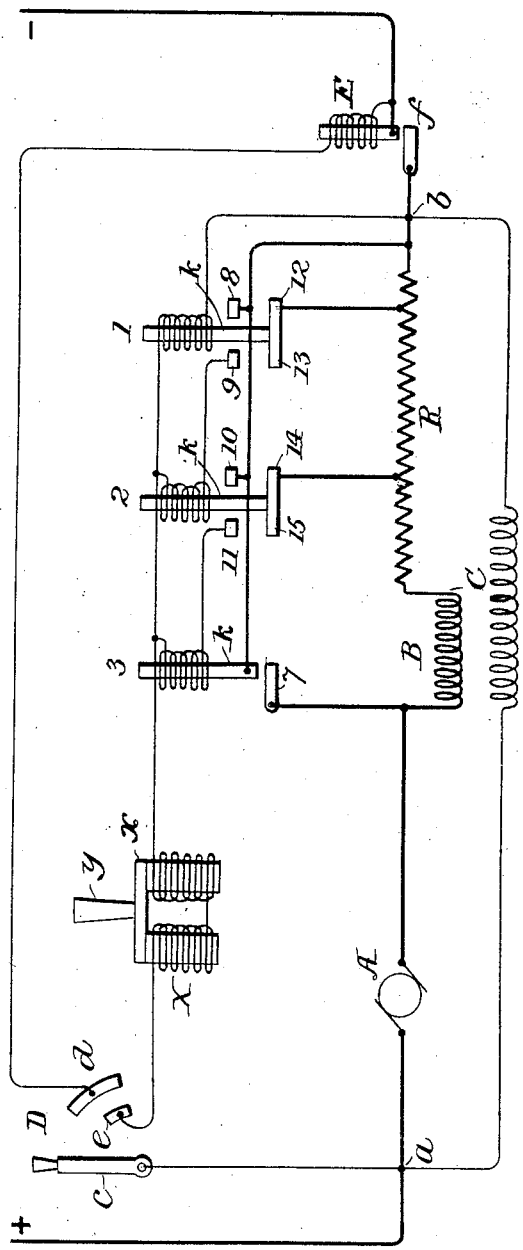

Figure 1 is a diagrammatic representation of an apparatus embodying my invention, and Fig. 2 is a diagrammatic view of a modified form of apparatus.

Referring to the drawings, A represents a motor, which may be of any suitable type, but shown in this instance as a shunt-wound motor, adapted to be connected in circuit with the supply-mains (indicated by + and −) and provided with a series field-winding B and a shunt-field C, the shunt-field being connected to the mains at the points $a$ and $b$.

A suitable switch D is arranged to control the admission of current to the motor-armature, and the throwing of the switch-lever $c$ into contact with contacts $d$ and $e$ will first complete the circuit of an electromagnet E, connected across the mains and controlling contacts $f$ in the main armature-circuit. The energizing of magnet E closes contacts $f$ and completes the circuit to the motor through resistance R and the series field-winding B. The operation of starting thus far described applies as well to Fig. 2 as to Fig. 1.

Instead of a mechanical dash-pot or other equivalent mechanical means for regulating the operation of short-circuiting the starting resistance R, I provide a series of magnets 1 2 3, of which there may be any desired number, connected across the line and receiving the line-potential, and these magnets are arranged for a high time constant, taking three or four seconds, for instance, to come up to full magnetization. This requires large magnets or additional means for accomplishing this end, as an additional coil X, having a high time constant connected in series with the magnets 1 2 3, which may be termed the "accelerating-magnets." The magnets 1 2 3 in Fig. 1 are wound to different strengths, so that magnet 1 operates to attract its armature 5 with less current strength than magnet 2 and magnet 2 actuates its armature 6 with a current strength less than the magnet 3. Any other equivalent construction and arrangement of magnets may be provided, so that the resistance R and series field B will be gradually short-circuited as the motor starts, and the armatures 5, 6, and 7 in Fig. 1 are actuated and attracted against the cores $k$ of magnets 1, 2, and 3.

The time constant of the accelerating-magnets may be made adjustable by providing an adjustable winding as a shunt to the magnet X or by varying the position of the iron core $x$ in the coil, as shown by means of the handle $y$.

Instead of using large magnets 1, 2, and 3 smaller magnets may be used and the same time adjustment provided for by operating one magnet after the other, thereby adding the time taken to magnetize each magnet, as illustrated in Fig. 2, and this modification may be used with or without the large coil X.

In Fig. 2 as magnet 1 actuates its core $k$ to close the circuit between contacts 8 12 and 9 13 a portion of the resistance R is short-circuited and the circuit of the next magnet 2 is closed, and a similar operation is repeated when magnet 2 becomes energized, the circuit of magnets 2 and 3 being normally open and closed between contacts 9 13 and 11 15, while armature 7 operates to short-circuit the series winding B. Insulated contacts 10 14 and 8 12 are connected, as shown, to short-circuit the resistance R.

Contacts *d* and *e* of switch D are made of different lengths, so that to stop the motor on moving the switch-blade *e* backward circuit with contact *e* is broken, first throwing the resistance R back into circuit, and then the motor-circuit is broken.

Without limiting myself to the precise construction and arrangement of parts shown and described, I claim—

1. The combination with a motor, of electromagnetic controlling means having a high time constant and connected to control the motor, substantially as set forth.

2. The combination with a motor, of electromagnetic controlling means having a high time constant and connected to control the motor, and means for varying said time constant, substantially as set forth.

3. The combination with a motor and its starting resistance, of magnets having a high time constant controlling said resistance and means for varying said time constant, substantially as set forth.

4. The combination with a motor and its starting resistance, of electromagnetic means having a high time constant controlling said resistance, and connected to receive the line-potential, and means for varying said time constant, substantially as set forth.

5. The combination with a motor, of a plurality of magnets connected to control the motor, and means included in the circuit of said magnets for giving to the same a high time constant, substantially as set forth.

6. The combination with a motor, and its starting resistance, of a plurality of magnets controlling said resistance and connected in series across the line to receive the line-potential, each of said magnets having a high time constant, substantially as set forth.

7. The combination with a motor and its starting resistance, of a plurality of magnets controlling said resistance and arranged for a high time constant, said magnets being connected across the line to receive the line-potential, substantially as set forth.

8. The combination with a motor and its starting resistance, of a plurality of controlling-magnets arranged for a high time constant connected across the line to receive the line-potential, and operating successively, and connections between the magnets such that each controls the circuit of the magnet next to operate, substantially as set forth.

In testimony whereof I have signed my name to this specification in the presence of two subscribing witnesses.

JOHN D. IHLDER.

Witnesses:
   C. B. MANVILLE,
   P. W. NEWELL.